United States Patent

Lee et al.

Patent Number: 6,108,313
Date of Patent: Aug. 22, 2000

[54] TRANSMITTER/RECEIVER FOR USE IN MULTICHANNEL TIME DIVISION DUPLEXING SYSTEM PROVIDING ISOLATION BETWEEN TRANSMISSION CHANNELS AND RECEPTION CHANNELS

[75] Inventors: Ki-Hyoung Lee, Seoul; Young-Il Kim, Gunpo, both of Rep. of Korea

[73] Assignee: Samsung Electronics Co., Ltd, Rep. of Korea

[21] Appl. No.: 09/008,884

[22] Filed: Jan. 20, 1998

[30] Foreign Application Priority Data

Jan. 17, 1997 [KR] Rep. of Korea .......................... 97-1241

[51] Int. Cl.[7] .................................................. H04L 12/50
[52] U.S. Cl. ............................... 370/294; 455/78; 333/1.1
[58] Field of Search ...................................... 370/276, 278, 370/275, 280, 294, 279, 282; 455/78, 80, 82, 83, 88, 296; 333/1.1, 24.2; 343/858

[56] References Cited

U.S. PATENT DOCUMENTS

| | | | |
|---|---|---|---|
| 4,451,832 | 5/1984 | Stites | 343/858 |
| 5,701,595 | 12/1997 | Green, Jr. | 455/83 |
| 5,815,803 | 9/1998 | Ho et al. | 455/78 |
| 5,896,563 | 4/1999 | Kawanami et al. | 455/82 |

FOREIGN PATENT DOCUMENTS 2307829   6/1997   United Kingdom .

OTHER PUBLICATIONS

Combined Search and Examination Report Under Sections 17 and 18(3). "The Patent Office". Jul. 1, 1998.

*Primary Examiner*—Douglas W. Olms
*Assistant Examiner*—Kenneth Vanderpuye
*Attorney, Agent, or Firm*—Dilworth & Barrese

[57] ABSTRACT

A transmitter/receiver for use in a multichannel time division duplexing system having an independent combiner and divider to isolate a transmission channel from a reception channel. The transmitter/receiver includes a first and second circulator connected, respectively, to a first and second transceiver. A transmission channel, formed between the first and second circulators and an antenna, transfers transmission signals from the first and second transceivers to the antenna in response to a transmission enable signal. A reception channel, formed between the first and second circulators and the antenna, transfers a reception signal from the antenna to the first and second transceiver in response to a reception enable signal. A switching control circuit is provided for generating the transmission enable signal during a transmission mode of operation and for generating the reception enable signal during a reception mode of operation.

11 Claims, 2 Drawing Sheets

TRANSMITTER/RECEIVER FOR USE IN MULTICHANNEL TIME DIVISION DUPLEXING SYSTEM PROVIDING ISOLATION BETWEEN TRANSMISSION CHANNELS AND RECEPTION CHANNELS

BACKGROUND OF THE INVENTION

1. Field of the Invention

The present invention relates to a transmitter/receiver for use in multichannel time division duplexing (TDD) system and, more particularly, to a transmitter/receiver which provides isolation between transmission channels during a transmission mode of operation and reception channels during a reception mode of operation.

2. Description of the Related Art

Referring to FIG. 1, a conventional transmitter/receiver (employed in a multichannel time division duplexing (TDD) system) having one port (i.e., a physical channel) for transmitting and receiving data is shown. The conventional transmitter/receiver includes an antenna 2, a first circulator 4 and a second circulator 8, a low noise amplifier (LNA) 6, a Wilkinson combiner/divider 10, a first switch 12-1 and a second switch 12-2, a first power amplifier (PA) 14-1 and a second power amplifier (PA) 14-2, a third switch 16-1 and a fourth switch 16-2, a first transceiver 18-1 and a second transceiver 18-2, and a switching control circuit 20. The first and second power amplifiers 14-1 and 14-2, respectively, are enabled in response to a transmission enable signal generated from the switching control circuit 20 (indicated by dotted line S1). The low noise amplifier 6 is enabled in response to a reception enable signal generated from the switching control circuit 20 (indicated by dotted line S2).

In a transmission mode of operation, transmission signals generated from the first transceiver 18-1 and the second transceiver 18-2 are transferred to the Wilkinson combiner/divider 10 through a first and a second transmission channel, respectively. The first transmission channel comprises the first switch 12-1, the third switch 16-1, and the first power amplifier 14-1. The second transmission channel comprises the second switch 12-2, the fourth switch 16-2 and the second power amplifier 14-2. The Wilkinson combiner/divider 10 combines the transmission signals received from the first and second transmission channels and transfers the combined transmission signals to the antenna 2 through the first circulator 4 and the second circulator 8. In the transmission mode, the low noise amplifier 6 is disabled so as to prevent the transmission signal output of the first circulator 4 from being transferred back to the second circulator 8 through the low noise amplifier 6.

Next, in a reception mode of operation, a signal received through the antenna 2 is transferred to the low noise amplifier 6 which is enabled by the reception enable signal (S2) generated from the switching control circuit 20. The low noise amplifier 6 then amplifies the received signal and sends the amplified signal to the Wilkinson combiner/divider 10 via the second circulator 8. The Wilkinson combiner/divider 10 divides the amplified signal and sends the divided signals to the first transceiver 18-1 and the second transceiver 18-2 through a first and a second reception channel, respectively. The first reception channel comprises the first switch 12-1 and the third switch 16-1. The second reception channel comprises the second switch 12-2 and the fourth switch 16-2. In the reception mode, the first power amplifier 14-1 and the second power amplifier 14-2 are disabled so as to prevent the output signals from the third switch 16-1 and the fourth switch 16-2 from being transferred back to the first switch 12-1 and the second switch 12-2, respectively, through the power amplifiers 14-1 and 14-2.

There are several problems with the conventional transmitter/receiver described above. For example, the device includes a significant amount of switches, which increases the size as well as the complexity of the system. Further, since the switches (12-1, 12-2, 16-1, and 16-2) are active elements, they have the poor intermodulation distortion (IMD) characteristics (as compared to the first and second circulators 4 and 8 which are passive elements). Moreover, since the conventional device includes the single Wilkinson combiner/divider 10, transmission signals may be fed back through the reception channels via the Wilkinson combiner/divider 10.

SUMMARY OF THE INVENTION

It is therefore an object of the present invention to provide a compact transmitter/receiver for use in a multichannel time division duplexing system.

It is another object of the present invention to provide a transmitter/receiver having an independent combiner and divider to isolate a transmission channel from a reception channel.

In accordance with one aspect of the present invention, a transmitter/receiver for use in a multichannel time division duplexing system includes an independent combiner and divider to isolate a transmission channel from a reception channel. The transmitter/receiver also includes a first circulator and a second circulator connected to a first transceiver and a second transceiver, respectively. A transmission channel, formed between the first and second circulators and an antenna, transfers transmission signals from the first and second transceivers to the antenna in response to a transmission enable signal. A reception channel, formed between the first and second circulators and the antenna, transfers a reception signal from the antenna to the first and second transceiver in response to a reception enable signal. A switching control circuit is provided for generating the transmission enable signal during a transmission mode of operation and for generating the reception enable signal during a reception mode of operation.

These and other objects, features and advantages of the present invention will become apparent from the following detailed description of an illustrative embodiment thereof, which is to be read in connection with the accompanying drawings.

DETAILED DESCRIPTION OF A PREFERRED EMBODIMENT

Figure 1:
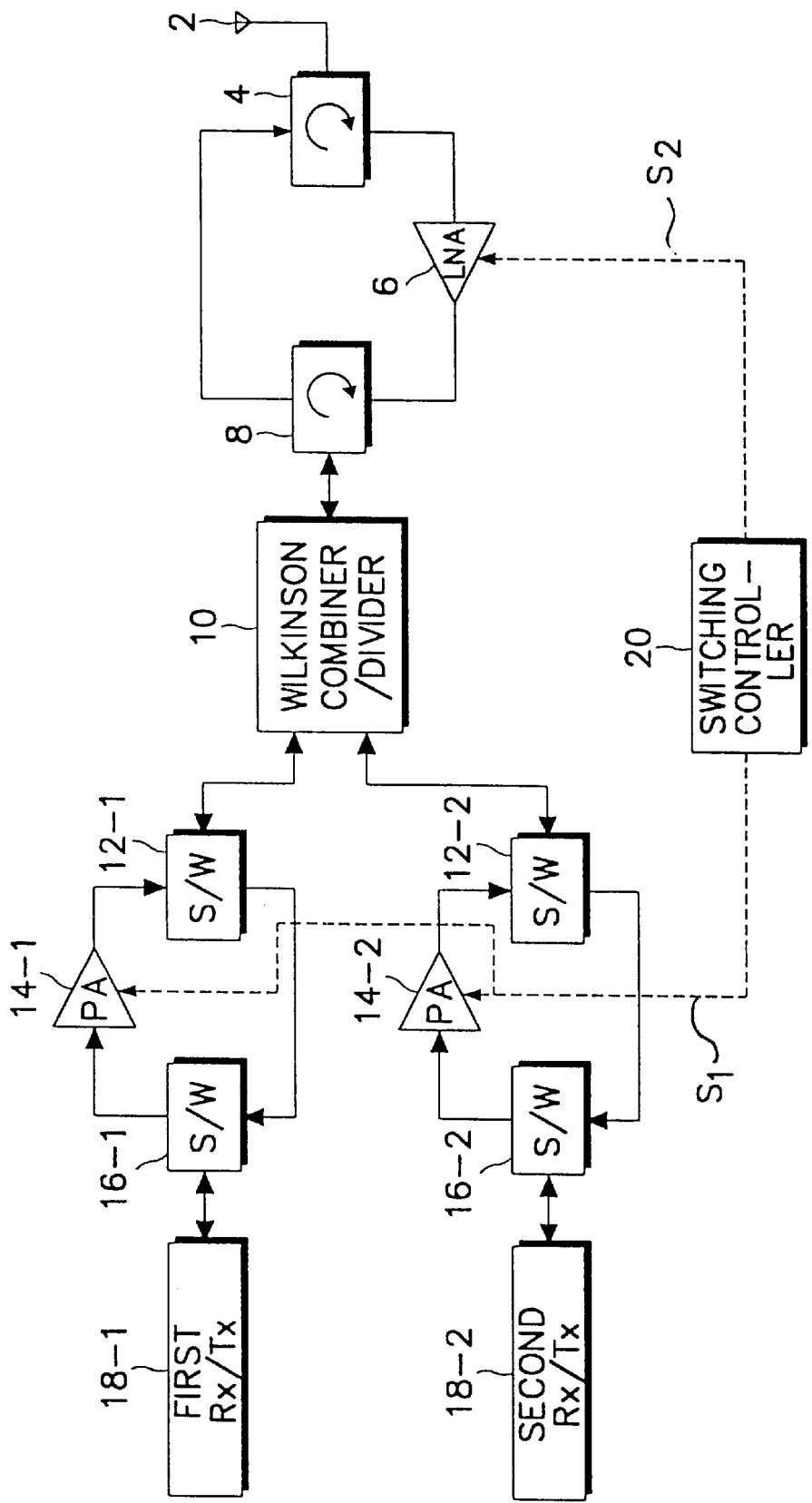
FIG. 1 is a block diagram of a conventional transmitter/receiver for use in a multichannel time division duplexing system.

A preferred embodiment of the present invention will be described in detail by reference to the attached drawings in which similar elements are denoted by the same reference numerals for clear understanding. Although the specific embodiment of the present invention (e.g., the detailed circuit elements) will be exemplarily defined and described in detail herein to clarify the subject matter of the present invention, the present invention may be implemented by those skilled in the art without such details. In the following description, however, details will not be provided for functions and constructions which are either known and obvious to one of ordinary skill in the art or which are unnecessary to understand, and would merely obscure, the subject matter of the present invention.

Figure 2:
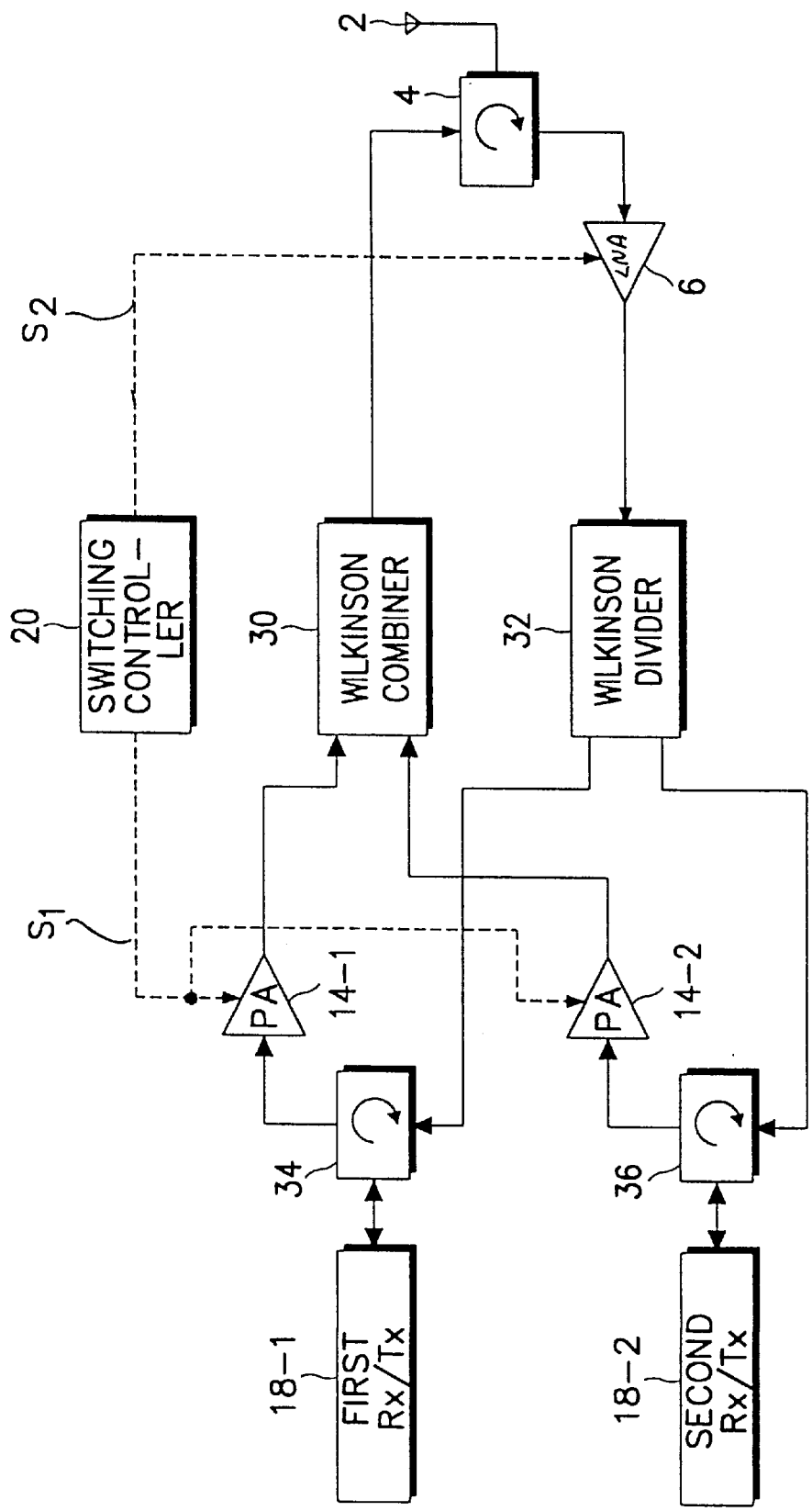
FIG. 2 is a block diagram of a transmitter/receiver for use in a multichannel time division duplexing system according to an embodiment of the present invention.

Referring now to FIG. 2, a transmitter/receiver for use in a multichannel time division duplexing system according to an embodiment of the present invention is shown. The transmitter/receiver includes a first transceiver 18-1 and a second transceiver 18-2, each having an input/output port (physical channel) (not shown). The input/output port (not shown) of the first transceiver 18-1 is connected to a second circulator 34. The input/output port (not shown) of the second transceiver 18-2 is connected to a third circulator 36. The second circulator 34 isolates a first transmission signal which is output from the first transceiver 18-1 from a first reception signal which is output from a Wilkinson divider 32. The third circulator 36 isolates a second transmission signal which is output from the second transceiver 18-2 from a second reception signal which is output from the Wilkinson divider 32. An output port (not shown) of the second circulator 34 and an output port (not shown) of the third circulator 36 are connected to a first power amplifier 14-1 and a second power amplifier 14-2, respectively. The first and second power amplifiers 14-1 and 14-2 are enabled in response to a transmission enable signal (S1) generated by a switching control circuit 20. When enabled, the first power amplifier 14-1 will amplify the first transmission signal generated by the first transceiver 18-1 and sent from the second circulator 34, and the second power amplifier 14-2 will amplify the second transmission signal generated by the second transceiver and sent from the third circulator 36.

An output port (not shown) of the first power amplifier 14-1 and an output port (not shown) of the second power amplifier 14-2 are connected, respectively, to a first input port (not shown) and a second input port (not shown) of a Wilkinson combiner 30. An output port (not shown) of the Wilkinson combiner 30 is connected to an input port (not shown) of a first circulator 4. The circulator 4 isolates the combined transmission signal which is output from the Wilkinson combiner 30 from the reception signal which is received via the antenna 2. It should be understood from the foregoing description that the first and second transceivers 18-1 and 18-2, the second and third circulators 34 and 36, the first and second power amplifiers 14-1 and 14-2, the Wilkinson combiner 30, the first circulator 4, and the antenna 2 constitute a transmission channel.

Next, an output port (not shown) of the first circulator 4 is connected to a low noise amplifier 6. The low noise amplifier 6 is enabled in response a reception enable signal (S2) which is generated by the switching control circuit 20. When enabled, the low noise amplifier 6 amplifies the reception signal received by the antenna 2 and sent from the first circulator 4. An output port (not shown) of the low noise amplifier 6 is connected to the Wilkinson divider 32. The Wilkinson divider 32 divides the amplified reception signal which is output from the low noise amplifier 6. The divided signal are then sent to the second circulator 34 and the third circulator 36 from a first output port (not shown) and a second output port (not shown) of the Wilkinson divider, respectively.

The switching control circuit 20 generates the transmission enable signal (S1) during a transmission mode of operation, and generates the reception enable signal (S2) during a reception mode of operation. It should be understood that the antenna 2, the first circulator 4, the low noise amplifier 6, the Wilkinson divider 32, the second and third circulators 34 and 36, and the first and second transceivers 18-1 and 18-2 constitute a reception channel.

In the transmission mode of operation, the first transmission signal generated by the first transceiver 18-1 is transferred to the first power amplifier 14-1 via the second circulator 34. In addition, the second transmission signal generated from the second transceiver 18-2 is transferred to the second power amplifier 14-2 via the third circulator 36. The first and second power amplifiers 14-1 and 14-2 are enabled in response to the transmission enable signal (S1) which is generated by the switching control circuit 20. When enabled, the first and second power amplifiers 14-1 and 14-2, will amplify the first and second transmission signals which are received from the second and third circulators 34 and 36, respectively. The Wilkinson combiner 30 combines the amplified transmission signals from the first and second power amplifiers 14-1 and 14-2, and provides the first circulator 4 with such combined transmission signal. The combined transmission signal is then transmitted through the antenna 2 and propagates through the air.

Next, in the reception mode of operation, a radio frequency (RF) signal received through the antenna 2 is transferred to the low noise amplifier 6 via the first circulator 4. In the reception mode, the low noise amplifier 6 is enabled in response to the reception enable signal (S2) which is generated by the switching control circuit 20. When enabled, the low noise amplifier 6 amplifies the received RF signal. The Wilkinson divider 32 then receives the amplified RF signal from the low noise amplified and divides such signal. The Wilkinson Divider 32 then sends the divided RF signals through its first and second output ports (not shown) to the second and third circulators 34 and 36, respectively. Then, the second circulator 34 and the third circulator 36 transfer the divided signals to the first transceiver 18-1 and the second transceiver 18-2, respectively.

It is to be appreciated from the foregoing description that, during the transmission mode, the switching control circuit 20 enables the first and second power amplifiers 14-1 and 14-2 and disables the low noise amplifier 6, thereby disconnecting and isolating the reception channel from the transmission channel. On the other hand, in the reception mode, the low noise amplifier 6 is enabled and the first and second power amplifiers 14-1 and 14-2 are disabled, thereby disconnecting and isolation the transmission channel from the reception channel. Consequently, such design provides complete isolation between the transmission channel and the reception channel during the transmission and reception modes of operation, thereby preventing interference between the transmission signal and the reception signal.

Equally important, as demonstrated above, is the fact that the transmitter/receiver of the present invention utilizes the second and third circulators 34 and 36 in place of the first, second, third and fourth switches 12-1, 12-2, 16-1, and 16-2 of the prior art transmitter/receiver illustrated in FIG. 1. Since the circulators are passive elements (in contrast to the switches which are active elements), the inter-modulation distortion (IMD) characteristics of the system are improved. Additionally, since the transmitter/receiver of the present invention eliminates the need for such switches, it is possible to make a more compact transmitter/receiver and at lower cost than the conventional transmitter/receiver.

Although an illustrative embodiment of the present invention has been described herein with reference to the accompanying drawings, it is to be understood that the invention is not limited to that precise embodiment, and that various other changes and modifications may be effected therein by one skilled in the art without departing from the true scope and spirit of the invention as defined in the appended claims.

What is claimed is:

1. A transmitter/receiver for use in a multichannel time division duplexing system having a first transceiver and a second transceiver, and an antenna, said transmitter/receiver comprising:
    a combiner, operatively coupled to said first and second transceiver, for combining a first transmission signal generated by said first transceiver with a second transmission signal generated by said second transceiver;
    a first circulator, operatively connected between said combiner and said antenna, for isolating said combined first and second transmission signal from a reception signal received through said antenna;
    a divider, operatively coupled to said first circulator, for dividing said reception signal from said antenna into a first reception signal and a second reception signal;
    a second circulator, operatively connected between said first transceiver and said divider, for isolating said first reception signal from said first transmission signal; and
    a third circulator, operatively connected between said second transceiver and said divider, for isolating said second reception signal from said second transmission signal.

2. The transmitter/receiver according to claim 1, further comprising:
    a first power amplifier, operatively connected between said second circulator and said combiner, for amplifying said first transmission signal generated by said first transceiver and received from said second circulator;
    a second power amplifier, operatively connected between said third circulator and said combiner, for amplifying said second transmission signal generated by said second transceiver and received from said third circulator;
    a low noise amplifier, operatively connected between said first circulator and said divider, for amplifying said reception signal received by said antenna and sent from said first circulator; and
    a switching controller, operatively coupled to said low noise amplifier and said first and second power amplifiers, for generating a transmission enable signal during a transmission mode of operation to enable said first and second power amplifiers, and for generating a reception enable signal during a reception mode of operation to enables said low noise amplifier.

3. The transmitter/receiver according to claim 2, wherein said combiner is a Wilkinson combiner.

4. The transmitter/receiver according to claim 2, wherein said divider is a Wilkinson divider.

5. A transmitter/receiver for use in a multi channel time division duplexing system having a first transceiver and a second transceiver, and an antenna, said transmitter/receiver comprising:
    a first circulator, operatively coupled to said first transceiver, for isolating a first transmission signal generated by said first transceiver from a reception signal received through said antenna;
    a second circulator, operatively coupled to said second transceiver, for isolating a second transmission signal generated by said second transceiver from said reception signal received through said antenna;
    a transmission channel, operatively connected between said first and second circulators and said antenna, for transferring said first and second transmission signals to said antenna during a transmission mode of operation of said transmitter/receiver;
    a reception channel, operatively connected between said first and second circulators and said antenna, for transferring said reception signal received by said antenna to said first and second transceivers during a reception mode of operation of said transmitter/receiver; and
    a switching control circuit, operatively coupled to said transmission channel and said reception channel, for generating a transmission enable signal to enable said transmission channel during said transmission mode of operation, and for generating a reception enable signal to enable said reception channel during said reception mode of operation, whereby said transmission channel and said reception channel are isolated during said transmission and reception modes of operation.

6. The transmitter/receiver according to claim 5, wherein said transmission channel comprises:
    a first power amplifier, operatively coupled to said first circulator and responsive to said transmission enable signal, for amplifying said first transmission signal generated by said first transceiver;
    a second power amplifier, operatively coupled to said second circulator and responsive to said transmission enable signal, for amplifying said second transmission signal generated from said second transceiver; and
    a combiner, operatively coupled between said first and second power amplifiers and said antenna, for combining said amplified first transmission signal output from said first power amplifier with said amplified second transmission signal output from said second power amplifier.

7. The transmitter/receiver according to claim 6, wherein said transmission channel further comprises a third circulator, operatively connected between said antenna and said combiner, for isolating said combined amplified first and second transmission signals from a reception signal received through said antenna.

8. The transmitter/receiver according to claim 5, wherein said reception channel comprises:
    a low noise amplifier, operatively coupled to said antenna and responsive to said reception enable signal, for amplifying said reception signal received from said antenna; and
    a divider, operatively connected between said low noise amplifier and said first and second circulators, for dividing said amplified reception signal output from said low noise amplifier.

9. The transmitter/receiver according to claim 8, wherein said reception channel further comprises a third circulator, operatively connected between said antenna and said low noise amplifier, for isolating said reception signal received through said antenna from said first and second transmission signals.

10. The transmitter/receiver according to claim 6, wherein said combiner is a Wilkinson combiner.

11. The transmitter/receiver according to claim 8, wherein said divider is a Wilkinson divider.

* * * * *